United States Patent [19]
Shinohara et al.

[11] Patent Number: 5,278,668
[45] Date of Patent: Jan. 11, 1994

[54] FACSIMILE APPARATUS WITH ENLARGEMENT FEATURE

[75] Inventors: Masahiro Shinohara, Hirakata; Tadakazu Ogiri, Takatsuki; Hiroyuki Tanaka, Ibaraki; Hiroaki Tsuchiya, Nishinomiya; Junji Jouma, Amagasaki; Naoyuki Ishida, Osaka; Junichi Inada, Ikoma, all of Japan

[73] Assignee: Mita Industrial Co., Ltd., Osaka, Japan

[21] Appl. No.: 798,208

[22] Filed: Nov. 26, 1991

[30] Foreign Application Priority Data
Nov. 30, 1990 [JP] Japan ................................. 2-338966

[51] Int. Cl.5 ............................................... H04N 1/04
[52] U.S. Cl. .................................... 358/451; 358/400
[58] Field of Search ............... 358/400, 437, 441, 443, 358/444, 451, 404; H04N 1/04

[56] References Cited

U.S. PATENT DOCUMENTS

| | | | |
|---|---|---|---|
| 4,814,893 | 3/1989 | Katoh | 358/451 |
| 4,878,126 | 10/1989 | Ichikawa | 358/451 |
| 4,882,630 | 11/1989 | Yamaguchi et al. | 358/451 |
| 4,942,479 | 7/1990 | Ichikawa | 358/451 |

FOREIGN PATENT DOCUMENTS 60-160771  8/1985  Japan .

*Primary Examiner*—Stephen Brinich
*Attorney, Agent, or Firm*—Beveridge, DeGrandi, Weilacher & Young

[57] ABSTRACT

In a facsimile apparatus, a received image data is stored in a memory, and an image represented by the image data is enlarged according to an enlargement ratio determined by the user and is outputted onto recording paper. The image data stored in the memory is maintained until another image data is received.

6 Claims, 3 Drawing Sheets

FACSIMILE APPARATUS WITH ENLARGEMENT FEATURE

BACKGROUND OF THE INVENTION

1. Field of the Invention

The present invention relates to a facsimile apparatus, and more specifically, to an image receiving function to receive an image information transmitted through a telecommunication line to output the image onto recording paper.

2. Description of the Prior Art

An image received by a facsimile apparatus has conventionally been outputted in the exact size of the original, and an image of a long-sized original is outputted being divided or reduced.

When a document is received as an image by a facsimile apparatus, there are occasions when letters, in the document, represented by the received image outputted onto recording paper is so small that it is difficult to read them or when some letters are defaced so that they cannot be read. Particularly in a facsimile apparatus such as a plain paper facsimile (PPF) apparatus, etc. where an outputted image is formed with toner, reproducibility of fine lines of outputted images deteriorates due to a characteristic of toner, so that letters are apt to be defaced. Since communication itself is normally completed even in this case, it is required to ask the communication partner to transmit the document (original) again after enlarging the letters therein.

SUMMARY OF THE INVENTION

An object of the present invention is to provide a facsimile apparatus where a received image can be enlarged and outputted.

In accordance with the present invention, a facsimile apparatus is provided with: storing means for storing an image data which is received; outputting means for outputting an image onto recording paper; controlling means for controlling the outputting means so that the outputting means outputs an image represented by the image data onto recording paper simultaneously when the storing means stores the image data or after the storing means stores the image data; determining means for determining an enlargement ratio of an image; and image enlarging means for enlarging an image represented by the image data stored by the storing means according to an enlargement ratio determined by the determining means and for outputting the image onto recording paper.

BRIEF DESCRIPTION OF THE DRAWINGS

This and other objects and features of this invention will become clear from the following description taken in conjunction with the preferred embodiments with reference to the accompanied drawings in which.

DETAILED DESCRIPTION OF THE PREFERRED EMBODIMENT

Embodiments of the present invention will hereinafter be described with reference to the drawings.

Figure 1:
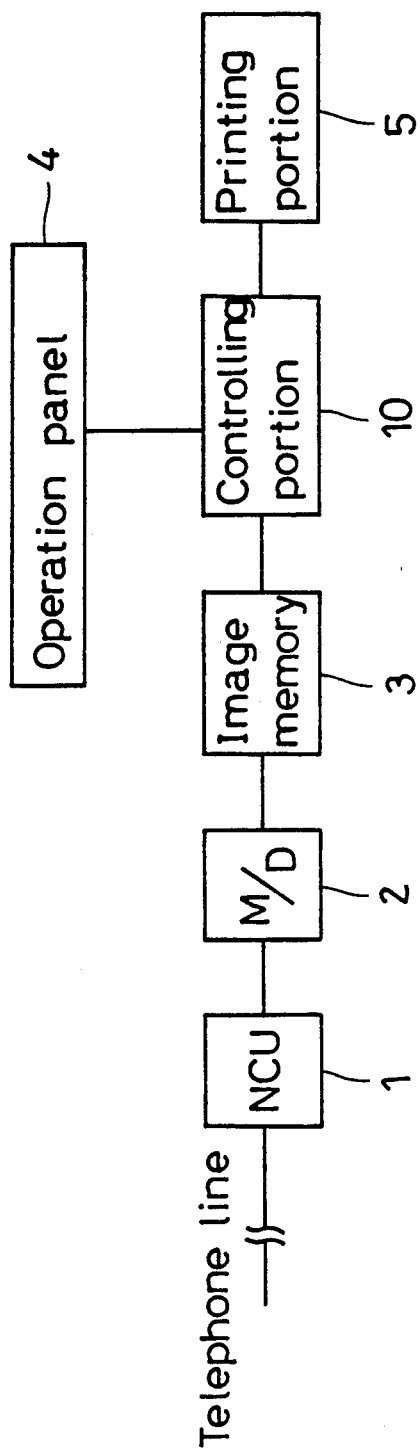
FIG. 1 is a block diagram showing portions, of an embodiment of a facsimile apparatus according to the present invention, which constitute an image receiving function.
Figure 2:
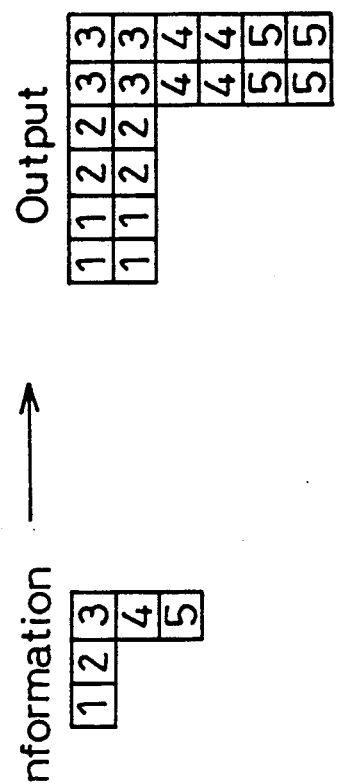
FIG. 2 is an explanatory view of an operation principle of an image enlarging means of the above embodiment.

Facsimile apparatuses are generally provided with an image transmitting function to read an original to transmit it as image data and an image receiving function to receive image data transmitted through a telephone line to output them onto recording paper. Of the above two functions, the present invention relates to the image receiving function. FIG. 1 is a block diagram showing portions, of an embodiment (hereinafter referred to as a first embodiment) of a facsimile apparatus according to the present invention, which constitute an image receiving function. As shown in the figure, an image receiving function according to this embodiment is constituted by a network control unit (NCU) 1 for connection to a telephone line, a modem/decoder 2 for demodulating and decoding picture signals, an image memory 3 for storing received image data, an operation panel 4 for the user to carry out operations, a printing portion 5 for outputting a received image onto recording paper, and a controlling portion 10 for controlling operations of the printing portion 5, etc. In this embodiment, received image data are stored in the image memory 3, and after the reception of an image is completed, the controlling portion 10 controls an operation of the printing portion 5 based on an enlargement ratio set by an operation of the operation panel 4 by the user to output the enlarged image onto recording paper. For example, as shown in FIG. 2, the controlling portion 10 controls the printing portion 5 so that it performs printing four times for information on a pixel stored in the image memory 3 to output on recording paper an image which is enlarged four times.

An operation, of a facsimile apparatus of the above feature, for receiving an image and for enlarging and outputting the image will hereinafter be described with reference to FIG. 3.

Figure 3:
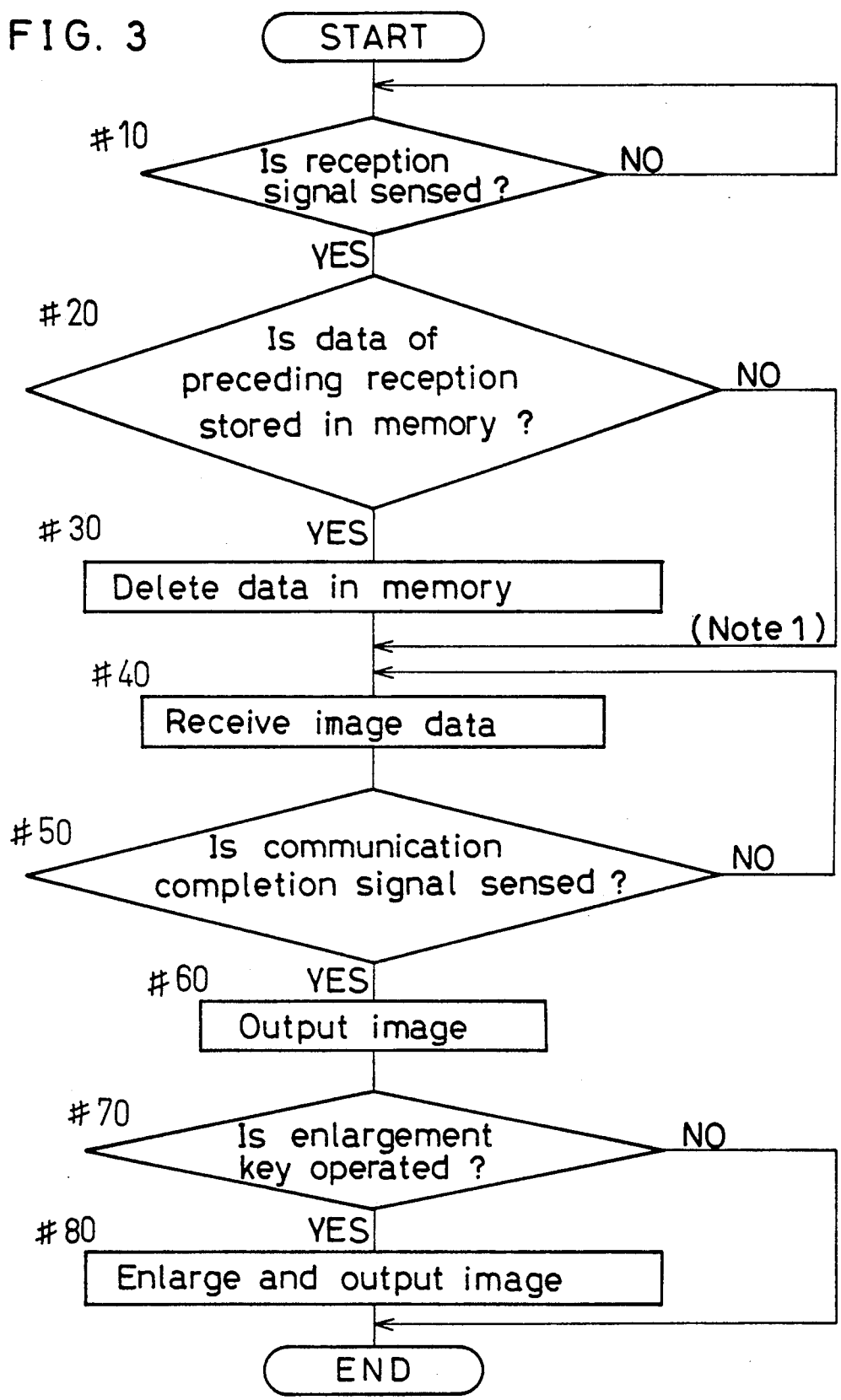
FIG. 3 is a flow chart of an operation, of the above embodiment, for receiving an image and for enlarging and outputting the image.

FIG. 3 is a flow chart showing the operation. As shown in the figure, when a predetermined reception signal is sensed under a waiting state, an operation for receiving an image is started (step #10). First, whether or not image data of a preceding reception is stored in the image memory 3 is determined (step #20). When it is not stored, the process proceeds to step #40. When it is stored, after deleting the image data of the preceding reception stored in the image memory 3, the process proceeds to step #40. In the facsimile apparatus having a confidential reception function, the data is stored in another memory when the image data of the preceding reception is confidential.

At step #40, reception of image data is continued until a predetermined communication completion signal is sensed (step #50), and the image data are stored in the memory 3. When the communication completion signal is sensed, the process proceeds to step #60, where an image represented by the image data stored in the memory 3 is outputted by the printing portion 5 onto recording paper. At this time, the image is not enlarged. The facsimile apparatus may be designed so that the outputting of an image at step #60 is performed while the reception of an image is being performed at steps #40 and #50.

This flow chart is finished when the user does not operate a predetermined enlargement key after the reception of an image is completed. When letters in a document represented by an image outputted onto recording paper in the above-described manner are so small that it is difficult to read them, or when the letters are defaced while outputted so that it is difficult to read them, the image can be enlarged. That is, when the user sets an enlargement ratio and operates a predetermined enlargement key on the operation panel 4, the controlling portion 10 controls an operation of the printing portion 5 in the above-described manner based on the setting so that an image represented by image data stored in the image memory 3 is enlarged and outputted onto recording paper. Thereby, letters in a document received by the facsimile apparatus becomes easier to read. Since image data stored in the memory 3 are maintained until the next reception (steps #20 and #30), the image can be enlarged and outputted repeatedly if required until the next reception.

Next, another embodiment (second embodiment) of a facsimile apparatus according to the present invention will be described with reference to FIG. 4.

Figure 4:
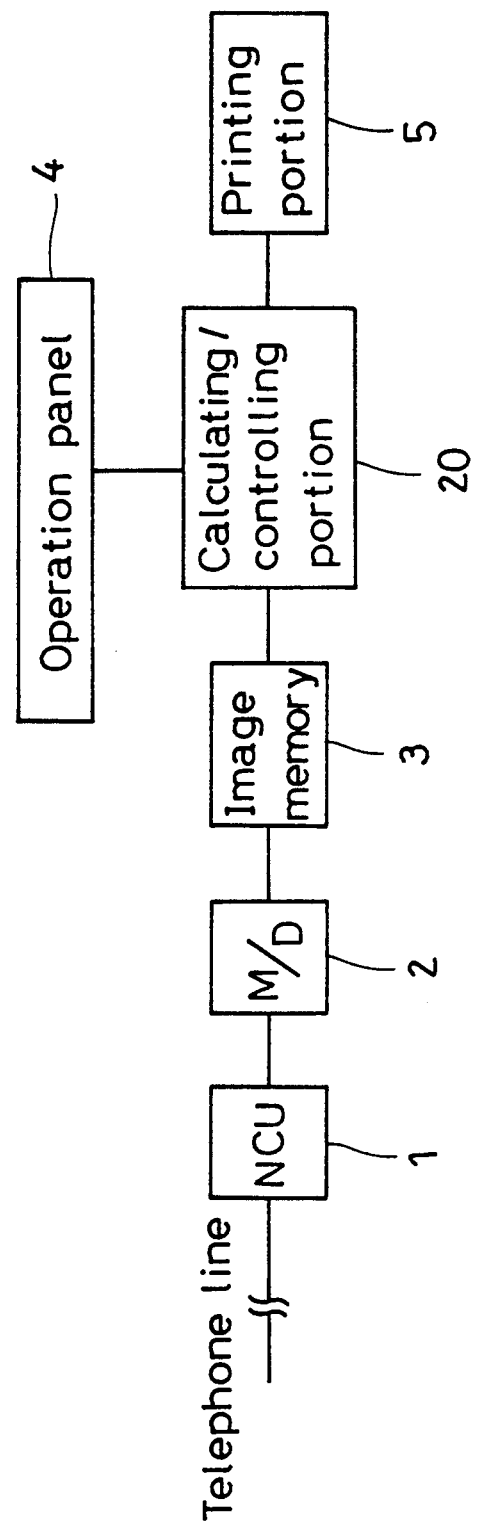
FIG. 4 is a block diagram showing portions, of another embodiment of a facsimile apparatus according to the present invention, which constitute an image receiving function.

FIG. 4 is a block diagram showing portions, of the second embodiment, which constitute an image receiving function. The second embodiment is different from the above-described first embodiment in that an image is enlarged by a calculation process of image data by a calculating/controlling portion 20 instead of by a control of an operation of the printing portion 5 by the controlling portion 10. In FIG. 4, the same portions as those of the first embodiment shown in FIG. 1 are identified by the same numerals and a description thereof is omitted, since a feature for an operation for receiving image data transmitted through a telephone line and storing them in the memory 3 is the same as that of the first embodiment.

According to this embodiment, in outputting an enlarged image, when the user sets an enlargement ratio and operates a predetermined enlargement key on the operation panel 4 after completion of an image reception, image data stored in the memory 3 is calculated based on the setting. The calculated image data are data representing an enlarged image. Based on the image data, as enlarged image is outputted onto recording paper by the printing portion 5. Thereby, letters in a document received by the facsimile apparatus becomes easier to read similarly to the case with the first embodiment. According to this embodiment, since images are enlarged by a calculation of image data, a degree of freedom for setting an enlargement ratio is greater in comparison to that of the first embodiment where images are enlarged by a control of the printing portion 5 by the controlling portion 10.

As described above, according to the present invention, when letters in a document represented by an image outputted onto recording paper are so small that it is difficult to read them, or when the letters are defaced while outputted so that it is difficult to read them, the image can be enlarged to be re-outputted on recording paper after the reception of the image is completed. Thereby, documents received by the facsimile apparatus are made easier to read. Further, by storing an image data which is once received until the next reception, the image can be repeatedly enlarged and outputted if required until the next reception.

Obviously, many modifications and variations of the present invention are possible in light of the above teachings. It is therefore to be understood that within the scope of the appended claims, the invention may be practiced other than as specifically described.

What is claimed is:

1. A facsimile apparatus comprising:
   storing means for storing image data which is received;
   outputting means for outputting an image onto recording paper;
   controlling means for controlling said outputting means so that said outputting means outputs an image represented by said image data onto recording paper simultaneously when said storing means stores said image data or after said storing means stores said image data;
   determining means for determining an enlargement ratio of an image in response to an operation of an operation panel; and
   image enlarging means for enlarging an image represented by said image data stored by said storing means according to an enlargement ratio determined by said determining means and for outputting the image onto recording paper,
   wherein said controlling means deletes said image data stored by said storing means when other image data is received.

2. A facsimile apparatus according to claim 1, wherein said image enlarging means controls an operation of said outputting means so that said outputting means enlarges an image according to said enlargement ratio and outputs the image onto recording paper.

3. A facsimile apparatus according to claim 1, wherein said image enlarging means comprises calculating means for calculating said image data for enlarging an image represented by said image data stored by said storing means, and after the calculation, controls said outputting means so that said outputting means outputs onto recording paper said enlarged image represented by said image data calculated by said calculating means.

4. A facsimile apparatus according to claim 1, wherein said image is a letter image and said image data represents said letter image.

5. A method of producing a facsimile image, comprising the steps of:
   receiving image data representative of an image;
   storing said image data in storing means;
   determining an enlargement ratio of said image in response to an operation of an operation panel;
   enlarging an image represented by said image data stored in said storing means according to said determined enlargement ratio;
   and outputting said enlarged image onto recording paper.

6. A method of producing a facsimile image in accordance with claim 5, including the step of outputting said image onto recording paper before determining an enlargement ratio of said image.

* * * * *